Aug. 25, 1936.    V. J. CHAPMAN    2,052,380
WELDING MACHINE
Filed June 25, 1932
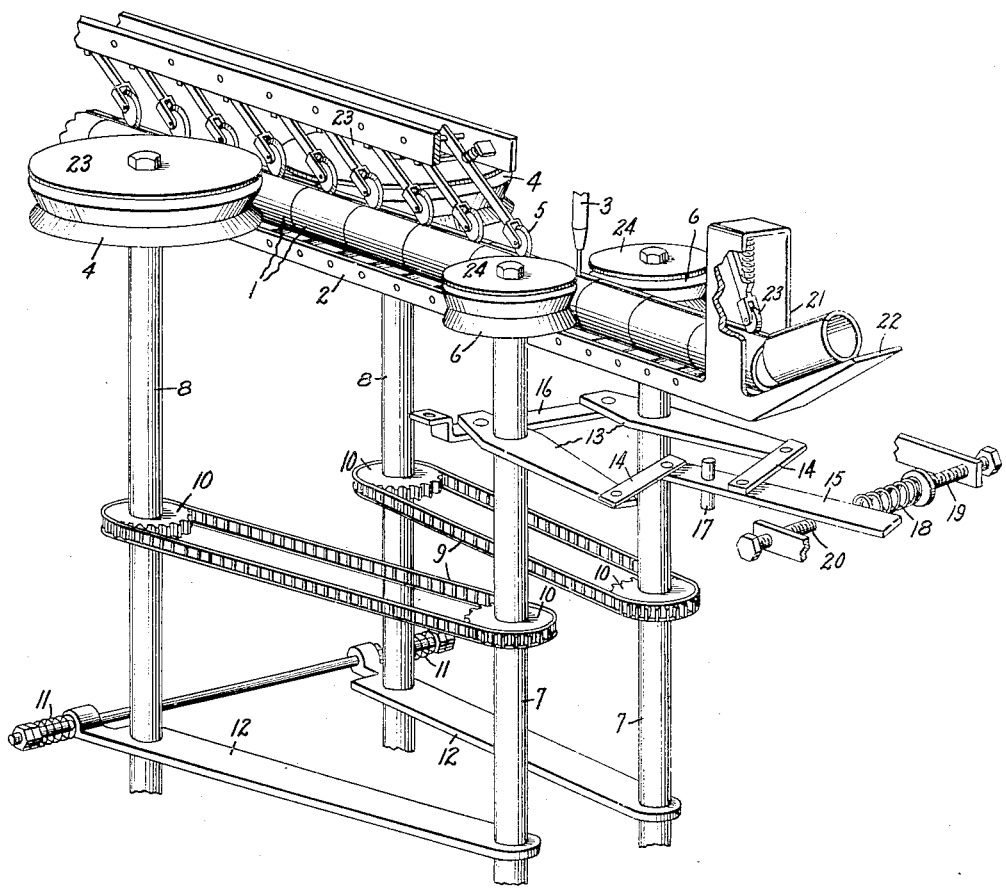
Inventor:
Verni J. Chapman,
by Charl V. Tullar
His Attorney.

Patented Aug. 25, 1936

2,052,380

UNITED STATES PATENT OFFICE 2,052,380

WELDING MACHINE

Verni J. Chapman, Schenectady, N. Y., assignor to General Electric Company, a corporation of New York Application June 25, 1932, Serial No. 619,260

1 Claim. (Cl. 219—6)

My invention relates to line welding and more particularly to automatic line welding machines in which a plurality of articles are fed in end-to-end engagement past a welding agency by means of which they are progressively welded as if they formed a single article having a seam of the total length of the seams of the several articles.

In such machines it is essential that the articles be fed past the welding agency in firm end-to-end engagement in order to prevent the formation of craters or burned spots at the beginning and at the end of the weld in each article. If an electric arc is employed as the welding agency, this firm end-to-end engagement is necessary in order not only to prevent the craters and burned portions above referred to, but also to prevent the arc being extinguished and the electrode being pushed down between the parts which would occur if any separation were permitted between the articles as they are fed past the welding electrode.

Furthermore in order to facilitate the welding operation and to produce uniform articles, the seams in the articles should be tightly closed at the time of performing the welding operation. This operation is generally necessary because the articles to be welded are usually preformed from flat material by a pressing operation and the seams are not always sufficiently closed to enable the welding agency to produce uniform results.

It is an object of my invention to provide means for feeding a plurality of articles in firm end-to-end engagement past a welding agency. It is a further object of my invention to provide means for tightly closing the seam at the point of welding.

Further objects of my invention will become apparent from a consideration of the following description taken in connection with the accompanying drawing which diagrammatically represents one embodiment thereof.

In the machine illustrated, the articles to be welded 1 are supported on a conveyor 2 and fed to a welding agency 3 by means of feed rolls 4. Any suitable welding agency may be employed for performing the welding operation. I prefer however to employ an automatic arc welding device for accomplishing this result and have indicated at 3 the nozzle portion of such a device. The seams between the several articles are alined and directed to the welding agency by a plurality of guide rolls 5. These guide rolls are provided with edged peripheries which engage the seams between the parts centering them at the tops of the articles and alining them with one another and the welding agency before directing them to the welding agency. The seam between each article is closed during the welding operation by means of pressure rolls 6. These pressure rolls are supported on shafts 7 which are positively driven by a suitable motor mechanism not illustrated in the drawing.

The shafts 8 for the feed rolls 4 are connected through chains 9 and sprockets 10 to pressure roll shafts 7. The sprockets employed on shafts 7 and 8 in the particular instance illustrated are of the same diameter and consequently these shafts are rotated at the same speeds. The diameters of the feed rolls 4 however are greater than the diameters of the pressure rolls 6 and consequently the feed rolls have a higher peripheral speed than the pressure rolls 6. The welding speed or speed at which the articles are fed through the machine is determined by the speed of pressure rolls 6. Consequently the feed rolls 4 make a slipping engagement with the parts and produce the desired end pressure between them by which they are fed in firm end-to-end engagement to the pressure rolls 6 and welding agency 3. The feed rolls are held in slipping engagement with the work parts 1 by means of springs 11. These springs act on the feed roll shafts 8 through levers 12 which are pivoted on shafts 7.

The pressure rolls 6 are forced into firm engagement with the articles to be welded by means of a mechanism comprising levers 13, 14 and 15 which act on the pressure roll shafts 7, and move the rolls 6 equal amounts thereby accurately centering the work piece relatively to the welding agency 3. Levers 13 are pivoted at one end to a support 16 and at their other ends to levers 14. Levers 14 are also pivoted on opposite sides of the supporting pivot 17 to lever 15 which is rotated about this pivot by means of the pressure applied thereto through a spring 18. This pressure may be varied by adjusting the tension of spring 18 by means of screw 19. A stop 20 is provided for preventing the pressure rolls 6 from being displaced a substantial distance toward one another when an article to be welded is not clamped between them.

The arrangement above described constitutes one of several means that may be employed for automatically feeding the articles to the welding agency in firm end-to-end engagement and for holding the seam tightly closed during the welding operation. The pressures employed will vary with the work to be performed. In a machine of the type above described and illustrated, designed for welding starter motor frames, the arrangement and adjustment of parts was such as to produce a longitudinal or endwise pressure between the articles of from 25 to 40 pounds and a seam pressure of from 3,000 to 4,000 pounds.

The welded articles leave the pressure rolls 6 joined to one another by a continuous weld which extends along their lengths. I have provided means for separating these articles by bending and breaking the weld between them. This means comprises an inclined member 22 located at the end of the conveyor 2 and a spring pressed roller 23 by means of which the article immediately below it and following the article on the inclined member is held in position on the conveyor. As the parts pass beneath the roller 23 and engage the inclined member 22 the weld between the parts is bent and broken as illustrated in the drawing. The articles may then be discharged into a suitable container at the end of the conveyor. It is of course apparent that other means may be employed for separating the articles at the completion of the welding operation. In some cases it may prove desirable to perform a reverse bending operation to break the welds between the articles.

The machine above described functions as follows. The operator places the articles to be welded on the conveyor 2 with the centering rolls 5 in contact with their seams. The conveyor 2 may be inclined to produce a gravity feed of these articles to rolls 4 or the operator may feed them thereto by hand. Rolls 4 make a slipping driving engagement with the articles and feed them in firm end-to-end engagement between the pressure rolls 6 where the welding operation is performed. The articles are then fed from the pressure rolls 6 through the weld breaking mechanism 21, 22 from which they are discharged into a suitable container.

By adjusting the rate of rotation of the pressure rolls 6 the speed of welding may be adjusted and by adjusting the separation of shafts 7 and 8 the distances between feed rolls 4 and pressure rolls 6 may be adjusted for articles of different sizes. The pressure applied to the work parts through rolls 6 is determined by the tension of spring 18 which may be adjusted by screw 19 and the feeding pressure is determined by the pressure applied to shafts 8 by springs 11 whose tension is also adjustable.

Without departing from my invention the feed rolls 4 may be made of the same diameter as the pressure rolls 6 and rotated at a higher rate of speed by employing larger sized sprockets 10 on shaft 7 than are employed on shafts 8. Furthermore in accordance with my invention, a belt and pulley transmission may be used between shafts 7 and 8. If such a transmission is used the tension of the belt may be adjusted so that slipping occurs between the pulleys and belt rather than between the feed rolls 4 and the articles 1 fed thereby. It is also within the scope of my invention to independently rotate feed rolls 4, and pressure rolls 6 and adjust their speeds of rotation so that the feed rolls will tend to feed the parts at a greater speed than the speed of welding determined by pressure rolls 6.

The peripheries of the feed and pressure rolls may be given any suitable shapes corresponding to the shapes of the articles to be welded. Preferably, the machine parts are enclosed by shields to protect them from spattered weld metal. In the drawing only shields 23 and 24 for the feed rolls 4 and pressure rolls 6 have been illustrated. The pressure rolls 6 may be water cooled to protect them from the action of the welding agency 3. Shielding and cooling arrangements such as referred to are commonly employed in welding machines and the arrangements referred to have consequently not been illustrated in the drawing.

Various modifications of the arrangement above illustrated and described may be made without departing from my invention.

What I claim as new and desire to secure by Letters Patent of the United States is:

Arc welding apparatus wherein a plurality of articles are fed in end-to-end engagement past a welding arc by means of which they are progressively welded as if they formed a single article having a seam of the total length of the seams of the several articles, said apparatus comprising means for alining the seams of said articles relatively to said welding arc, means including a plurality of pressure rolls for closing and locating the seams in said articles under said welding arc and for determining the speed at which said articles are moved past said welding arc, means including a plurality of feed rolls for feeding said articles in firm end-to-end engagement to said last mentioned means, and means for imparting a higher peripheral speed to said feed rolls than is imparted to said pressure rolls, said feed rolls engaging said articles and tending to feed them at a greater speed than said pressure rolls which also engage said articles.

VERNI J. CHAPMAN.